United States Patent [19]

Pounder

[11] Patent Number: 4,813,443

[45] Date of Patent: Mar. 21, 1989

[54] METHOD FOR CONTROLLABLY POSITIONING A SOLENOID PLUNGER

[75] Inventor: Edwin Pounder, La Canada, Calif.

[73] Assignee: Signet Scientific Company, El Monte, Calif.

[21] Appl. No.: 178,132

[22] Filed: Apr. 6, 1988

[51] Int. Cl.[4] ............................................. F16K 31/6
[52] U.S. Cl. .................................. 137/1; 251/129.05; 251/129.08; 137/468; 137/486; 137/487.5; 310/15; 310/23; 318/135
[58] Field of Search ...................... 251/129.05, 129.08, 251/129.15; 310/15, 23; 318/135; 137/487.5, 486, 468

[56] References Cited

U.S. PATENT DOCUMENTS 3,307,824  3/1967  Weisheit .
3,424,951  1/1969  Barker .
3,476,128  11/1969  Barker .
3,659,631  5/1972  Rakoske .
3,874,407  4/1975  Griswold .
4,313,465  2/1982  Holzem et al. .
4,319,606  3/1982  Hoogenboom .
4,373,697  2/1983  Phelps .
4,548,047  10/1985  Hayashi et al. .

Primary Examiner—Arnold Rosenthal
Attorney, Agent, or Firm—Pretty, Schroeder, Brueggemann & Clark

[57] ABSTRACT

An improved method for controllably positioning the plunger of a solenoid apparatus at a target position between its two extreme positions. The plunger is spring biased to a retracted position, and an electrical coil is intermittently pulsed to drive the plunger against the spring bias toward an extended position, such that the plunger oscillates about the target position. A precise, stable control of the plunger's oscillating motion about the target position is achieved by continuously measuring the plunger's actual position, in real time, based on a series of measurements of electrical current conducted through the electrical coil when it is being pulsed.

14 Claims, 2 Drawing Sheets

METHOD FOR CONTROLLABLY POSITIONING A SOLENOID PLUNGER

BACKGROUND OF THE INVENTION

This invention relates generally to solenoid apparatus, and, more particularly, to methods for controllably positioning a solenoid plunger at a selected position between a fully retracted position and a fully extended position.

Solenoid apparatus of the kind having a reciprocable plunger are usually used in an ON/OFF mode. A spring biases the plunger toward its retracted position, and an electrical coil can be energized to drive the plunger against the spring bias to its extended position. One common use of a solenoid apparatus of this kind is as part of a fluid valve, where fluid flow is controlled in accordance with the plunger's position.

It is sometimes desirable to position the plunger at a selected position between its retracted and extended positions. In the past, this has frequently been achieved by pulsing the electrical coil at a selected duty cycle and at a frequency higher than the solenoid's response time. However, such systems are not believed to have operated in a fully optimized manner; the systems have not controllably pulsed the electrical coil based on real-time measurements or estimates of the plunger's actual position. Systems that have used a solenoid as a fluid valve, for example, have sometimes included a flowmeter for measuring the average fluid flow rate and adjusting the duty cycle at which the electrical coil is pulsed, accordingly. However, the resulting control is not believed to be as efficient as is possible and does not necessarily provide as uniform and stable a flow rate as is possible.

It should, therefore, be appreciated that there is a need for a method for controllably driving the plunger of a solenoid apparatus to a selected target position between its retracted and extended positions, with the control being based on an accurate, real-time estimation of the plunger's changing position. The present invention fulfills this need.

SUMMARY OF THE INVENTION

The present invention resides in a method for controllably driving a plunger of a solenoid apparatus to a selected target position between a retracted position and an extended position, the positioning being based on an accurate estimation of the plunger's actual position, as it changes with time. The solenoid apparatus includes spring means for biasing the plunger toward the retracted position and electrical coil means for use in driving the plunger toward the extended position. A voltage is intermittently applied to the electrical coil means, with the plunger being magnetically driven toward the extended position when the voltage is applied, and with the plunger being urged by the spring means back toward the retracted position when the voltage is not applied. In accordance with the invention, the decision on when to remove the voltage from the electrical coil means is made in accordance with a measurement of the plunger's actual position based on measurements of the electrical current being conducted through the electrical coil means. The time at which the voltage is removed from the electrical coil means during each successive cycle of the plunger's oscillation can thereby be optimized so as to oscillate the plunger about a selected target position plunger oscillation about the target position can be minimized by damping.

More particularly, during those periods of time when the voltage is being applied to the electrical coil means, the step of measuring electrical current is performed repeatedly and the measurement of the plunger's position is updated with each successive current measurement. During those time periods when the voltage is not applied to the repeatedly estimated based on the plunger's initial and velocity measurements and on known physical parameters of the spring means and plunger (e.g., spring constant and mass). The step of removing the voltage is performed, each time, as the plunger is being driven towards the extended position, but before it reaches the target position. Similarly, the step of applying the voltage is performed, each time, as the plunger is being urged toward the retracted position, but before it reaches the target position. Preferably, in each case, the step of applying or removing is performed when the plunger has moved a predetermined fraction of the distance to the target position from the plunger's position closest to the retracted position or the extended position, respectively.

In another aspect of the invention, the step of applying the voltage is performed each time only after the electrical current in the electrical coil means has diminished substantially to zero. This ensures that the plunger's actual position can be measured accurately solely based on the successive electrical current measurement.

In yet another aspect of the invention, the solenoid apparatus forms part of a fluid valve control system, where fluid flow rate varies in accordance with the plunger's position. In such a system, flowmeter means measures the fluid flow rate and the plunger's target position is selected according to that measured flow rate.

Other features and advantages of the present invention should become apparent from the following description of the preferred method, taken in conjunction with the accompanying drawings, which illustrate by way of example, the principles of the invention.

DESCRIPTION OF THE PREFERRED METHOD OF THE INVENTION

Figure 1:
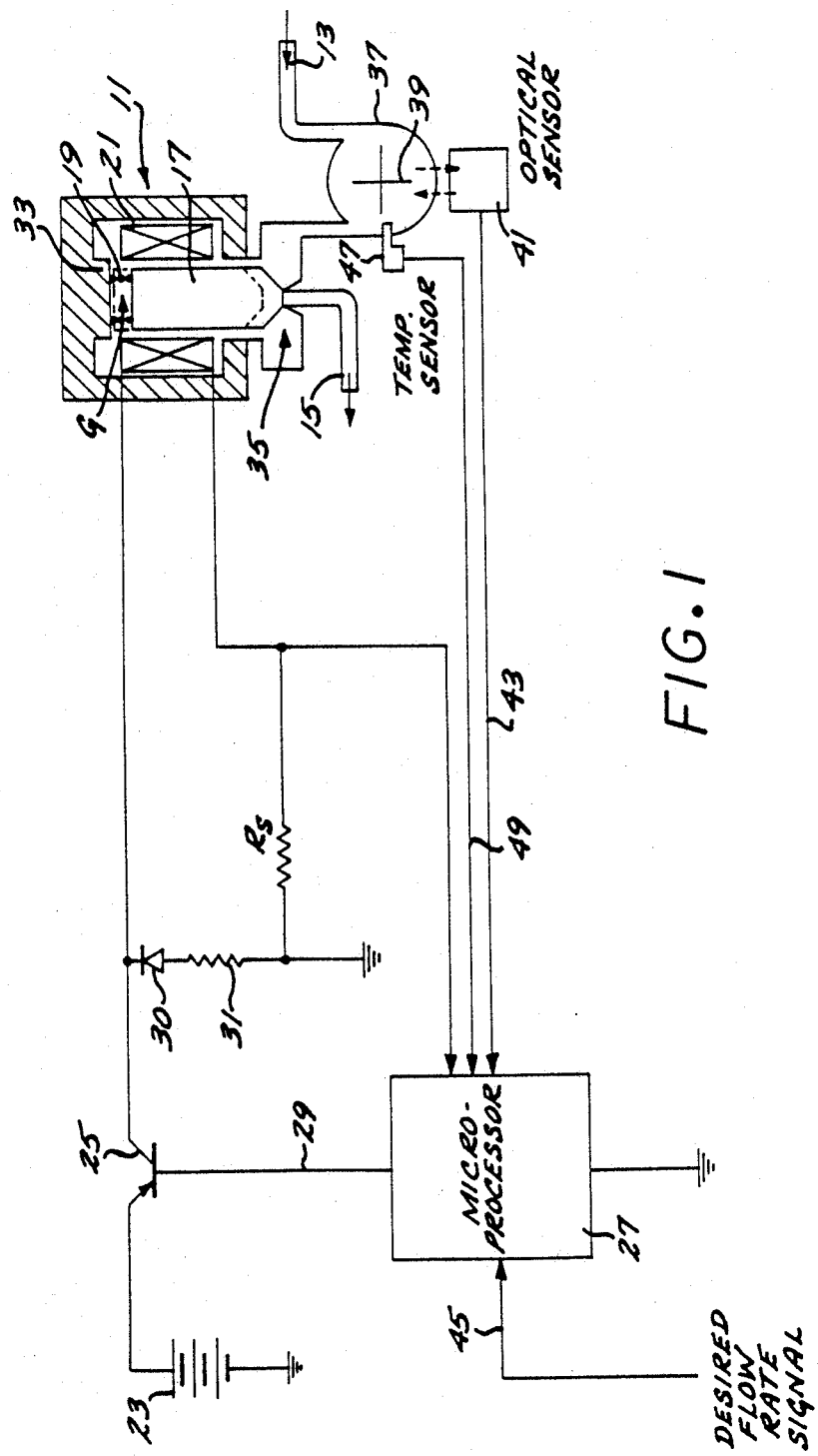
FIG. 1 is a simplified block diagram of a fluid valve control system that includes a solenoid valve that is selectively positioned so as to precisely regulate the fluid flow rate.

With reference now to the drawings, and particularly to FIG. 1, there is shown a fluid flow control system that includes a solenoid valve 11 for regulating the flow of fluid from an inlet 13 to an outlet 15. The solenoid valve includes a plunger 17 that can be moved reciprocally between a retracted or closed position, in which fluid flow is prevented, and an extended or open position, in which maximum fluid flow is permitted In FIG. 1, the solid lines depict the plunger in its closed position and the phantom lines depict the plunger in its open position. A spring 19 biases the plunger toward its closed position, and an electrical coil 21 can be selectively energized to drive the plunger against this spring bias to the open position. In addition, a pressure drop from the inlet to the outlet provides a force that supplements the spring force.

It is frequently desired to regulate the fluid flow rate to a specific value less than its maximum. This can be done by energizing the electrical coil 21 intermittently, such that the average flow rate through the solenoid valve corresponds to the specific desired value. If the frequency at which the coil is periodically energized is substantially greater than the solenoid's response time, the plunger 17 can oscillate about a particular intermediate position without ever reaching either the open position or the closed position.

The electrical coil 21 of the solenoid valve 11 is excited by intermittently applying a dc voltage from a battery 23 using a switching transistor 25. A microprocessor 27 outputs a drive signal on line 29 for controllably switching the transistor ON and OFF in such a way as to drive the solenoid plunger 17 to a selected target position, $G_T$, between the retracted and extended positions. The desired fluid flow rate is thereby provided between the inlet 13 and the outlet 15. A series-connected diode 30 and resistor 31 shunt the electrical coil, to dampen the collapsing electrical field in the coil each time the transistor is switched OFF.

In previous solenoid valve control systems of this kind, the solenoid valve was driven at a specific frequency and duty cycle selected to provide the desired average flow rate. However, such systems were not adapted to estimate the solenoid plunger's actual position, in real time, as it was being periodically driven by the solenoid's electrical coil. Accordingly, such prior systems could not necessarily provide an optimum control of fluid flow.

In accordance with the invention, the actual position of the oscillating solenoid plunger 17 is estimated, in real time, so that the transistor 25 can be switched ON and OFF in an optimal fashion, to controllably position the plunger at the desired target position, $G_T$. When the transistor is switched ON, and a voltage is thus being applied to plunger's position is measured based simply on a succession of electrical current measurements. When the transistor is switched OFF, on the other hand, the plunger's position is estimated based on the plunger's initial position and velocity measurements as well as on known parameters such as the spring constant of the spring 19, the mass of the plunger, and any pressure differential between the fluid inlet 13 and fluid outlet 15, as that differential might affect the particular motion of the plunger. By knowing the plunger's position, within a certain degree of accuracy, a limit cycle can be reached in which the plunger is optimally positioned relative to the target position.

It is not necessarily intuitively clear that, while the microprocessor 27 is applying a voltage to the electrical coil 21 of the solenoid valve 11, the instantaneous position of the plunger 17 can be estimated based solely on a measurement of the following analysis will show this to be the case.

The equation relating voltage to current in the electrical circuit of FIG. 1 that includes the battery 23, transistor 25, electrical coil 21 (having resistance $R_c$), an a current-sensing resistor $R_s$ is as follows:

$$V = (R_c + R_s) * i(t) + \frac{d}{dt}(N * \Phi(t)) \quad (1)$$

where:
 V=voltage of battery 33
 i(t)=electrical current
 N=number of turns in coil 21
 $\Phi(t)$=magnetic flux density
Thus:

$$N * [\Phi(t) - \Phi(t_0)] = V(t - t_0) - (R_c + R_s) * \int_{t_0}^{t} i(t)dt \quad (2)$$

Figure 2:
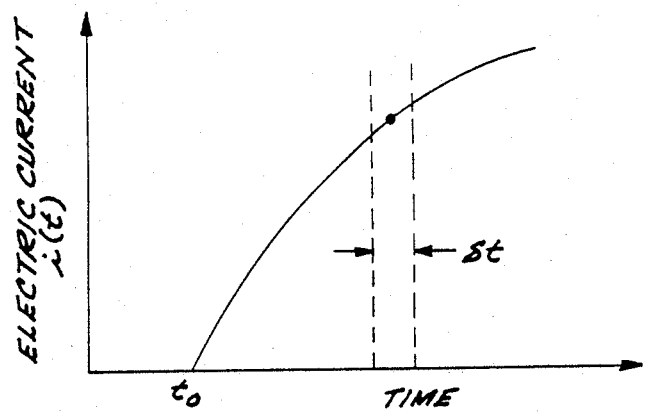
FIG. 2 is a graph depicting the electrical current conducted through the solenoid coil of FIG. 1, after a voltage has been applied to it.

Integrating equation (2) and converting it to a sampled data format, yields:

$$\frac{N}{V * \delta t}[\Phi(t) - \Phi(t_0)] = n - \frac{(R_c + R_s)}{V} \sum_{1}^{n} i_n(t) \quad (3)$$

where:
 n=electrical current sample number
 $\delta t$=time between successive samples It is known that when a dc voltage is applied to the electrical circuit of FIG. 1, the electrical current will increase with time, as shown in FIG. 2. In accordance with equation (3), magnetic flux density, $\Phi(t)$, likewise will increase with time. This increasing magnetic flux density will create an attractive force between the plunger 17 and a magnetic pole piece 33, located above the plunger in FIG. 1. This force, which is proportional to the square of the magnetic flux density, causes the plunger to be accelerated upwardly, toward the pole piece, to open the fluid valve 35.

Of special interest is the case where $i(t_0)$ is zero, such that $\Phi(t_0)$, likewise is zero. Thus, equation (3) reduces to the following, which can be used by the microprocessor 27 to compute $\Phi(t)$:

$$\Phi(t) = \frac{V\delta t}{N} * \left[ n - \frac{(R_c + R_s)}{V} * \sum_{1}^{n} i_n(t) \right] \quad (4)$$

Thus, if the electrical current from a previous voltage pulse has been permitted to diminish very close to zero, then a new value for the magnetic flux density, $\Phi(t)$, can be computed for the present pulse without an accumulative error, since $\Phi(t_0)$ is near zero.

Figure 3:
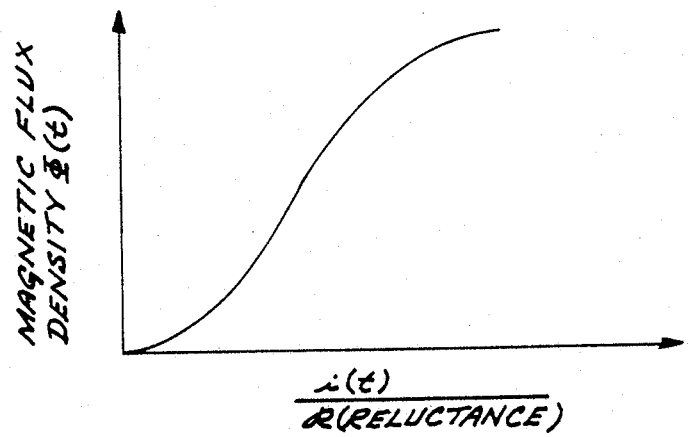
FIG. 3 is a graph showing how magnetic flux in the solenoid varies according to the ratio of electrical current in the coil to reluctance in the magnetic circuit.

Knowing the magnetic flux density, $\Phi(t)$, the actual position of the plunger 17 relative to the pole piece 33, and thus the position of the valve 35, can be determined. In general, for any magnetic circuit, the magnetic flux density varies with the ratio of electrical current to reluctance, R. This relationship is generally non-linear, and one example is depicted in FIG. 3. The reluctance R of the magnetic circuit of FIG. 1 varies according to the size of the gap, G, between the movable plunger 17 and the pole piece 33. For plunger-type solenoids, the relationship between reluctance and gap is usually linear and given by the following equation:

$$R = AG + B \quad (5)$$

The constants A and B can both be readily measured for a particular solenoid geometry.

Consequently, the magnetic flux density can be determined from equation (4), based on the succession of electrical current measurements, the reluctance R can be ascertained with reference to the graph of FIG. 3, based on the observed current and computed magnetic flux density, and the gap, G, therefore can be computed using equation (5), based on the measured factors A and B and the computed reluctance R. Thus, the plunger's instantaneous position can be accurately computed, in real time, based solely on a series of electrical current observations during a single voltage pulse. In addition, the microprocessor also can compute the instantaneous velocity $dG/dt$ and instantaneous acceleration $d^2G/dt^2$ of the plunger 17, based on these same current observations. As will be discussed below, the microprocessor 27 uses these computed values to determine precisely when to switch the transistor 25 ON and OFF.

The plunger is accelerated toward its open position or its closed position in response to the sum of various forces present at any one time. These forces can include the magnetic force imparted by the electrical coil 21, fluid pressure forces, fluid flow forces, fluid damping forces, and the spring force from the spring 19. When the transistor 25 is switched ON, the plunger will be accelerated toward its open position, and, conversely, when the transistor is switched OFF, the plunger will be accelerated toward its closed position The microprocessor 27 determines the plunger's actual position, in real time, based on a number of known, fixed system parameters as well as a series of electrical current measurements supplied to it every time the transistor is switched ON.

When the transistor 25 is switched OFF, the equations and relationships identified and discussed above are no longer applicable for determining the plunger's actual position. During this stage of the plunger's oscillating cycle, the microprocessor 27 determines its position by extrapolating from its computed position and velocity at the time the transistor was first switched OFF. This computing can be done conveniently using a simple equation of motion, taking into account the plunger's initial position and velocity at the time the transistor was first switched off, as well as the plunger's mass and all of the various forces acting on the plunger during its motion. As previously mentioned, these forces include, for example, the spring constant force of the spring 19, fluid pressure forces, fluid flow forces and fluid damping forces.

At all times during the oscillating cycle of the plunger 17, the microprocessor 27 therefore can accurately estimate the plunger's actual position. Based on these continuous position estimates, as well as the velocity and acceleration estimates, the microprocessor can determine the optimum times at which to switch the transistor 25 ON and OFF.

Figure 4:
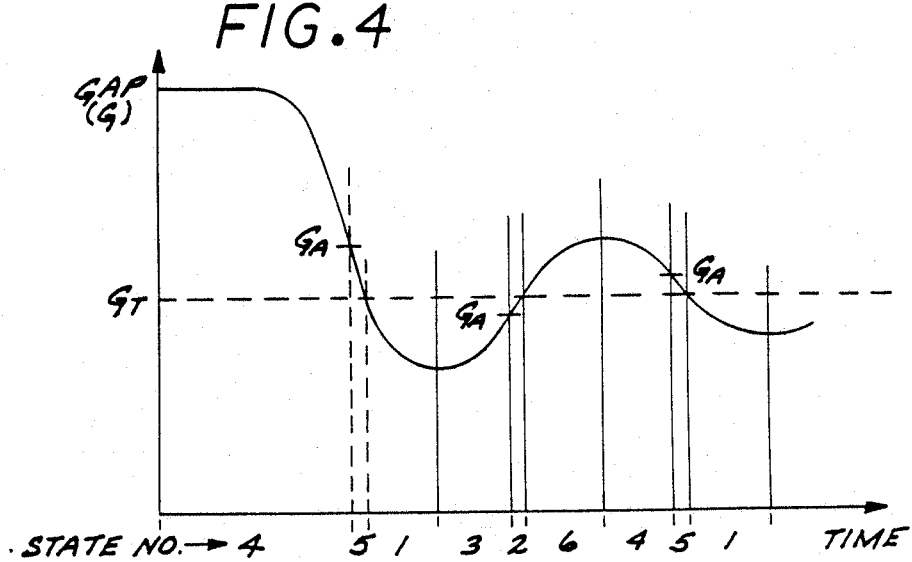
FIG. 4 is a graph showing how the method of the invention causes the solenoid plunger to oscillate about a target position.

FIG. 4 is a graph depicting several exemplary cycles of the plunger's oscillating motion about a target position, between the plunger's open position and closed position. The microprocessor 27 optimizes this oscillating motion by basing its ON/OFF control of the transistor 25 on its continuous real-time estimate of this motion. A limit cycle is thereby reached in which the plunger 17 oscillates stably about the target position Fluid damping of the plunger ensures that the oscillations have a relatively low amplitude.

The microprocessor 27 switches the transistor OFF, and thus initiates an acceleration of the plunger 17 back toward its closed position, when the plunger is moving toward the open position, but before it actually reaches the target position. Similarly, the microprocessor switches the transistor ON, and thus initiates its acceleration toward the open position, when the plunger is moving toward the closed position, but before it actually reaches the target position. In each case, the switching preferably occurs when the plunger has moved to a position $G_A$ that is a predetermined fraction, e.g., three-fourths, of the way from its position at zero velocity to the target position. This is depicted in FIG. 4.

The table presented below shows the control algorithm implemented by the microprocessor 27 in switching the transistor 25 ON and OFF in accordance with the real-time estimates of the plunger's position, velocity and acceleration:

TABLE

| State Number | Plunger Position, $G-G_T$ | Plunger Velocity, $dG/dt$ | Plunger Accel., $d^2G/dt^2$ | Control Algorithm |
|---|---|---|---|---|
| 0 | <0 | <0 | <0 | Xstr OFF |
| 1 | <0 | <0 | >0 | xstr OFF |
| 2 | <0 | >0 | <0 | xstr ON |
| 3 | <0 | >0 | >0 | xstr OFF, $G < G_A$ xstr ON, $G > G_A$ |
| 4 | >0 | <0 | <0 | xstr OFF, $G < G_A$ xstr ON, $G > G_A$ |
| 5 | >0 | <0 | >0 | xstr OFF |
| 6 | >0 | >0 | <0 | xstr ON |
| 7 | >0 | >0 | >0 | xstr ON |

In state 3, where the gap between the plunger 17 and the pole piece 33 is less than desired (i.e., the fluid valve 35 is more open than desired), and the plunger's velocity and acceleration are toward the desired target, the microprocessor 27 will initially switch the transistor 25 OFF but switch it ON as soon as it determines that the plunger has moved past the threshold position $G_A$ that is the predetermined fraction of the distance from its position at zero velocity to the target position. An opposite control is effected in state 4, as indicated in the table. States 0 and 7 will not occur in ordinary circumstances, but the appropriate control is provided for in the event they do.

With reference again to FIG. 4, the applicable state vector from the Table is indicated for each segment of the plunger's oscillating motion. Thus, for example, for the portion of the plunger's motion between the target position and its furthest open position, the state 1 is applicable and the microprocessor 27 therefore switches the transistor 25 OFF.

With reference again to FIG. 1, it will be observed that the system further includes a flowmeter 37 for producing a signal indicative of the average flow rate of fluid flowing from the inlet 13 to the outlet 15. As depicted, this flowmeter includes a rotating paddle wheel 39 whose motion is sensed by an optical sensor 41, to produce a succession of pulses having a frequency related to flow rate. These pulses are transmitted on line 43 to the microprocessor 27, where they are converted to a flow rate measurement and compared with a desired flow rate, as input to the microprocessor on line 45. If the two differ, an appropriate adjustment is made to the plunger's target position $G_T$, which will result in a change in the timing cycle of the drive signal supplied on line 29 to the transistor 25, to reduce the difference substantially to zero.

A temperature sensor 47 is also provided, for sensing the temperature of the fluid and transmitting a corresponding signal on line 49 to the microprocessor 27. Fluid temperature can affect fluid viscosity, which 1 in turn affects the relationship between the flowmeter signal on line 43 and the fluid's actual flow rate. The microprocessor adjusts the flowmeter signal, fluid's actual flow rate. The microprocessor adjusts the flowmeter signal, accordingly, before comparing it with the desired flow rate signal received on line 45.

It should be appreciated from the foregoing description that the present invention provides an improved method for controllably positioning the plunger of a solenoid apparatus at a target position between its two extreme positions. The plunger is spring biased to a retracted position, and an electrical coil is intermittently pulsed to drive the plunger against the spring bias toward an extended position, such that the plunger oscillates about the target position. A precise, stable control of the plunger's oscillating motion about the target position is achieved by continuously measuring the plunger's actual position, in real time, based on a series of measurements of electrical current conducted through the electrical coil when it is being pulsed.

Although the present invention has been described in detail with reference to the presently referred method, those of ordinary skill in the art will appreciate that various modifications can be made without departing from the invention. Accordingly, the invention is defined only by the following claims.

I claim:

1. A method for controllably driving a plunger of a solenoid apparatus to a selected target position between a retracted position and an extended position, the solenoid apparatus including spring means for biasing the plunger toward the retracted position and electrical coil means for use in driving the plunger toward the extended position, the method comprising steps of:
   applying a voltage to the electrical coil means, to drive the plunger toward the extended position;
   measuring the electrical current conducted through the electrical coil means and measuring the plunger's position in accordance with the electrical current measurement;
   removing the voltage from the electrical coil means when the measurement of the plunger's position has a predetermined relationship with the selected target position, such that the spring means thereafter moves the plunger toward the retracted position; and
   repeating the steps of applying, measuring and removing, after a prescribed time delay.

2. A method as defined in claim 1, wherein the step of measuring is performed repeatedly and the measurement of the plunger's position is updated with each successive electrical current measurement.

3. A method as defined in claim 1, wherein:
   the method causes the plunger's position to oscillate about the target position; and
   the step of removing is performed as the plunger is being driven toward the extended position, but before it reaches the target position.

4. A method as defined in claim 3, wherein the step of removing is performed when the plunger has been driven to a position that is a predetermined fraction of the distance to the target position from the plunger's position closest to the retracted position.

5. A method as defined in claim 1, wherein after the step of removing, the plunger's position is estimated based on known parameters of the spring means and the plunger.

6. A method as defined in claim 5, wherein:
   the method causes the plunger's position to oscillate about the target position;
   the step of removing is performed as the plunger is being driven toward the extended position, but before it reaches the target position; and
   the step of repeating the step of applying is performed as the plunger is being moved toward the retracted position, but before it reaches the target position.

7. A method as defined in claim 6, wherein:
   the step of removing is performed when the plunger has been driven to a position that is a predetermined fraction of the distance to the target position from the plunger's position closest to the retracted position; and
   the step of repeating the step of applying is performed when the plunger has been moved to a position that is a predetermined fraction of the distance to the target position from the plunger's position closest to the extended position.

8. A method as defined in claim 1, wherein the step of repeating the step of applying is performed only after the electrical current in the electrical coil means has diminished substantially to zero.

9. A method as defined in claim 1, wherein:
   the solenoid apparatus controls the flow of a fluid through a channel;
   the solenoid apparatus is used in combination with flowmeter means for measuring the flow rate of fluid through the channel; and
   the method further includes a step of selecting the plunger's target position based on the fluid flow rate measurement provided by the flowmeter means.

10. A method for controllably driving a plunger of a solenoid apparatus to a selected target position between a retracted position and an extended position, the solenoid apparatus including spring means for biasing the plunger toward the retracted position and electrical coil means for use in driving the plunger toward the extended position, the method comprising steps of:
   intermittently applying a voltage to the electrical coil means, such that when the voltage is applied the plunger is magnetically driven by the electrical coil means toward the extended position and such that when the voltage is not applied the plunger is urged by the spring means toward the retracted position; and
   repeatedly determining the plunger's position as it is being alternately magnetically driven toward the extended position and urged toward the retracted position, the step of repeatedly determining including steps of
   repeatedly measuring the electrical current conducted through the electrical coil means when the voltage is being applied thereto, and determining the plunger's position based on the repeated electrical current measurements, and
   repeatedly computing the plunger's position when the voltage is not being applied to the electrical coil means, based on the plunger's position and velocity at the moment the voltage is first removed from the electrical coil means, the plunger's mass, and the spring constant of the spring means;

wherein the step of intermittently applying selects the time of the intermittent application of the voltage to the electrical coil means in accordance with the changing determination of plunger position provided in the step of repeatedly estimating.

11. A method as defined in claim 10, wherein:

the method causes the plunger's position to oscillate about the target position;

the step of intermittently applying is initiated, each time, plunger is being driven toward the retracted position, but before it reaches the target position; and the step of intermittently applying is terminated, each time, as the plunger is being moved toward the extended position, but before it reaches the target position.

12. A method as defined in claim 11, wherein:

the step of intermittently applying is initiated, each time, when the plunger has been driven to a position that is a predetermined fraction of the distance to the target position from the plunger's position closest to the extended position; and the step of intermittently applying is terminated, each time, when the plunger has been moved to a position that is a predetermined fraction of the distance to the target position from the plunger's position closes to the retracted position.

13. A method as defined in claim 10, wherein the step of intermittently applying is repeated, each time, only after the electrical current in the electrical coil means has diminished substantially to zero.

14. A method as defined in claim 10, wherein:

the solenoid apparatus controls the flow of a fluid through a channel;

the solenoid apparatus is used in combination with flowmeter means for measuring the flow rate of fluid through the channel; and the method further includes a step of selecting the plunger's target position based on the fluid flow rate measurement provided by the flowmeter means.

* * * * *

UNITED STATES PATENT AND TRADEMARK OFFICE
CERTIFICATE OF CORRECTION

PATENT NO. : 4,813,443
DATED     : March 21, 1989
INVENTOR(S) : Edwin Pounder

It is certified that error appears in the above-identified patent and that said Letters Patent is hereby corrected as shown below:

In column 2, line 1, after "selected target position" insert --with great accuracy and stability. The amplitude of the--.

In column 2, line 9, after "applied to the" insert --electrical coil means, the plunger's position is--.

In column 2, line 10, after "initial" insert --position--.

In column 3, line 46, after "applied to" insert --the electrical coil 21 of the solenoid valve 11, the--.

In column 3, line 63, after "measurement of the" insert --electrical current conducted through the coil. The--.

In column 3, line 67, change "an" to --and--.

In column 5, line 27, after "closed position" insert --.--.

In column 6, line 52, after "plunger's motion between" delete ";".

UNITED STATES PATENT AND TRADEMARK OFFICE
CERTIFICATE OF CORRECTION

PATENT NO. : 4,813,443
DATED : March 21, 1989
INVENTOR(S) : Edwin Pounder

It is certified that error appears in the above-identified patent and that said Letters Patent is hereby corrected as shown below:

In column 7, line 7, after "viscosity, which" delete "1".

Signed and Sealed this

Thirteenth Day of February, 1990

Attest:

JEFFREY M. SAMUELS

Attesting Officer     Acting Commissioner of Patents and Trademarks